United States Patent [19]

Kober et al.

[11] 3,989,581

[45] Nov. 2, 1976

[54] APPARATUS FOR PRODUCING BOARDS OF FILAMENTARY MATERIAL

[75] Inventors: Harald Kober, Wanne-Eickel; Eduard J. C. Huydts, Dusseldorf-Gerresheim, both of Germany

[73] Assignee: G. Siempelkamp & Co., Krefeld, Germany

[22] Filed: June 10, 1975

[21] Appl. No.: 585,507

Related U.S. Application Data

[63] Continuation of Ser. No. 381,436, July 23, 1973, abandoned.

[30] Foreign Application Priority Data

July 27, 1972 Germany ........................... 2236895

[52] U.S. Cl. ................................ 156/510; 100/110; 100/222; 100/215; 156/62.2; 156/581; 156/538; 198/802; 264/109; 264/118; 264/128; 264/163; 425/84

[51] Int. Cl.$^2$ ......................................... B32B 31/00

[58] Field of Search ............... 156/42, 510, 45, 530, 156/62.2, 539, 267, 580, 348, 581, 382; 162/153, 305, 154, 415, 286, 416, 297, 225, 227, 399; 100/144, 222, 152, 297, 178, 98, 215, 110; 83/685, 690, 686; 198/45, 138, 155; 425/84; 428/434; 264/109, 128, 118, 163

[56] References Cited

UNITED STATES PATENTS

| | | | |
|---|---|---|---|
| 2,407,514 | 9/1946 | Rembert | 264/119 |
| 2,495,043 | 1/1950 | Wiley et al. | 156/306 |
| 2,642,782 | 6/1953 | Chapman | 100/222 |
| 2,655,196 | 10/1953 | Magnani | 156/538 |
| 2,712,169 | 7/1955 | Buttress | 156/347 |
| 2,717,537 | 9/1955 | Chapman | 162/305 |
| 2,878,728 | 3/1959 | Clark | 100/215 |
| 3,112,243 | 11/1963 | Egerstrand | 100/110 |
| 3,226,764 | 1/1966 | Hostettler | 100/215 |

FOREIGN PATENTS OR APPLICATIONS

| | | | |
|---|---|---|---|
| 1,011,810 | 7/1957 | Germany | 198/155 |
| 3,816,242 | 8/1963 | Japan | 156/382 |
| 806,209 | 12/1955 | United Kingdom | 156/62.2 |
| 874,938 | 8/1961 | United Kingdom | 156/62.2 |

*Primary Examiner*—William A. Powell
*Assistant Examiner*—J. J. Gallagher
*Attorney, Agent, or Firm*—Karl F. Ross; Herbert Dubno

[57] ABSTRACT

A succession of rectangular mats, consisting essentially of asbestos fibers or other filamentary material held together by a wet hydraulic binder such as cement, are conveyed by a series of trays through the gap between a pair of horizontal platens of a press. The upper platen carries a die for trimming the edges of a mat to be compacted, with the tray acting as an anvil. The trays are linked near their leading ends with two parallel, endless conveyor chains and have their trailing ends supported by rollers on rails which parallel the upper and lower runs of the chains and which form ramps for guiding these rollers onto the lower level downstream of the press and onto the upper level upstream of the press whereby each tray runs horizontally through the press between a loading and an unloading station.

5 Claims, 7 Drawing Figures

FIG. 5
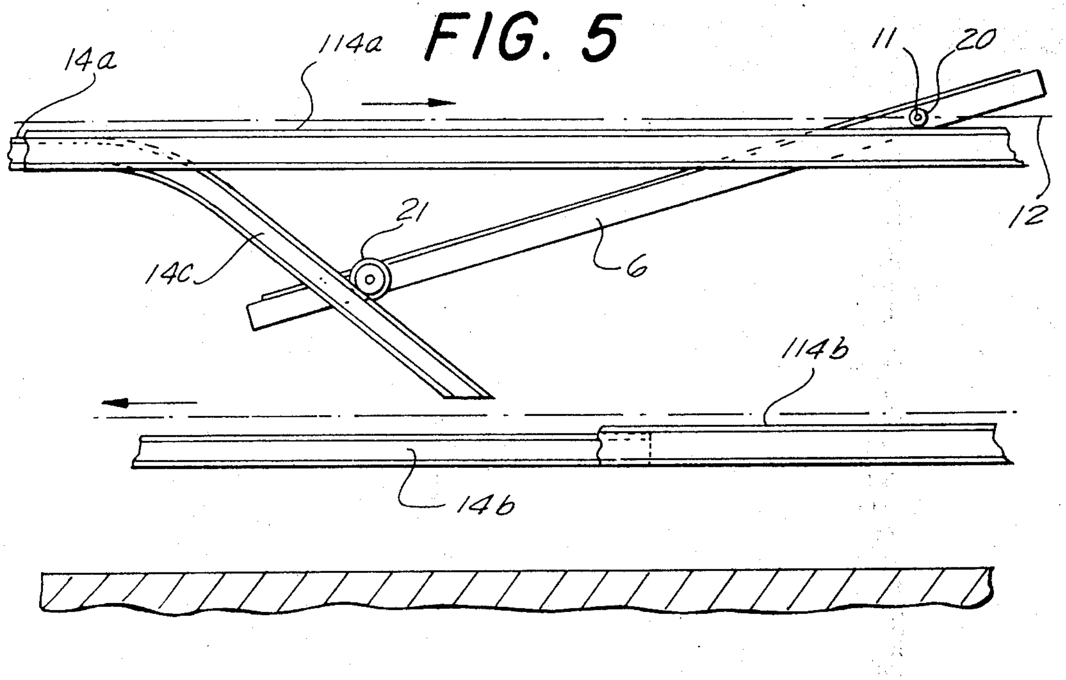
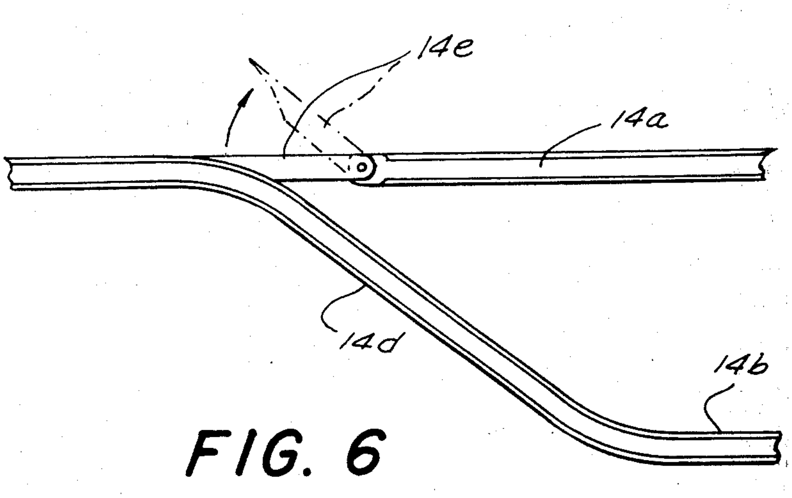
FIG. 6
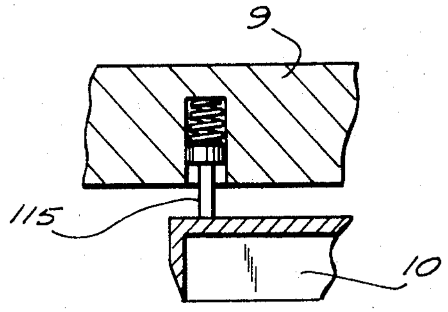
FIG. 7

APPARATUS FOR PRODUCING BOARDS OF FILAMENTARY MATERIAL

This is a continuation of application Ser. No. 381,436, filed 23 July 1973, now abandoned.

FIELD OF THE INVENTION

Our present invention relates to an apparatus for producing boards of filamentary material, e.g. asbestos fibers, held together by a hydraulic binder such as cement applied in a wet state to a mat of such fibers.

BACKGROUND OF THE INVENTION

Boards of this description can be serially produced by forming a continuous web, consisting of the filamentary material impregnated by the binder, on the periphery of a rotating drum and cutting this web into rectangular sections constituting the mats that are to be compacted in a press with relatively reciprocable lower and upper platens. As described in commonly owned application Ser. No. 381,435 filed by one of us, Harald Kober, on 23 July 1973, now U.S. Pat. No. 3,914,079, the mats may be compacted as rapidly as they are produced by the use of a perforated high-speed conveyor enabling the application of suction to the undersides of the mats on their way to the press and during the compacting operation so that the position of the mats relative to the conveyor and therefore to the press platens is positively maintained. This obviates the need for jointly compacting a stack of such mats which involves additional operating steps and also results in nonuniform processing.

In conventional systems in which the mats are compressed in a stack, they are trimmed to size after being removed from the press and separated. This requires the provision of a special trimming station downstream of the press.

OBJECTS OF THE INVENTION

The general object of our present invention is to provide an improved apparatus eliminating the need for such a special trimming station.

A more particular object is to provide a conveyor construction designed to facilitate the trimming of oversized mats in the press itself.

SUMMARY OF THE INVENTION

These objects are realized, pursuant to our present invention, by providing the upper press platen with die means (generally in the shape of a sharp-edged rectangular frame) adapted to trim the mat edges during compaction, against an anvil constituted by a mat-carrying tray forming part of a conveyor which transports the mats from a loading station upstream of the press to an unloading station downstream of same.

According to a more particular feature of our invention, the conveyor further comprises a pair of parallel endless chains led in vertical loops with upper and lower runs, the trays of the conveyor having leading ends articulated to these chains and trailing ends provided with rollers riding on rails which form upper and lower tracks adjacent the respective chain runs; ascending upstream ramps and descending downstream ramps allow these rollers to shift from the lower to the upper track and vice versa so as to maintain the trays in a substantially horizontal position at an upper level, on which they pass through the press, and again at a lower level on which they return underneath the press to the loading station. This construction allows the use of relatively long trays in combination with chains guided along deflecting rollers of relatively small radius.

In order to facilitate the trimming of mats of different thickness, we prefer to mount the cutting frame of the die in a yieldable manner on the upper platen. Thus, the die may be urged downwardly under fluid pressure or with the aid of loading springs until it cuts completely through the mat and strikes the tray or, possibly, a fine-mesh screen underlying the mat on the tray. Such screens help support the relatively loose mixture of fibers and binder prior to compaction, particularly when the trays are preforated to allow the draining of excess water from a hydraulic binder through the similarly perforated lower platen in the press; these perforations could also be used for the exertion of suction as described in the above-identified Kober application. The screens could be individual to each tray and, in that case, may have an area larger than that of the trimmed mats or boards if they are to be imbedded in the underside of these boards; they could also extend beyond that area and either be trimmed with the mat or, if of sufficiently hard material, remain intact during the cutting operation. In the latter instance the screens may be part of a continuous band overlying the entire series of trays coming from the loading station.

BRIEF DESCRIPTION OF THE DRAWING

The above and other features of our invention will now be described in detail with reference to the accompanying drawing in which:

FIG. 5 is a sectional view taken on line V — V of FIG. 4;

FIG. 6 is an enlarged view of area VI of FIG. 1; and

FIG. 7 is a fragmentary cross-sectional view of a modification of part of the arrangement of FIG. 3.

SPECIFIC DESCRIPTION

Figure 1:
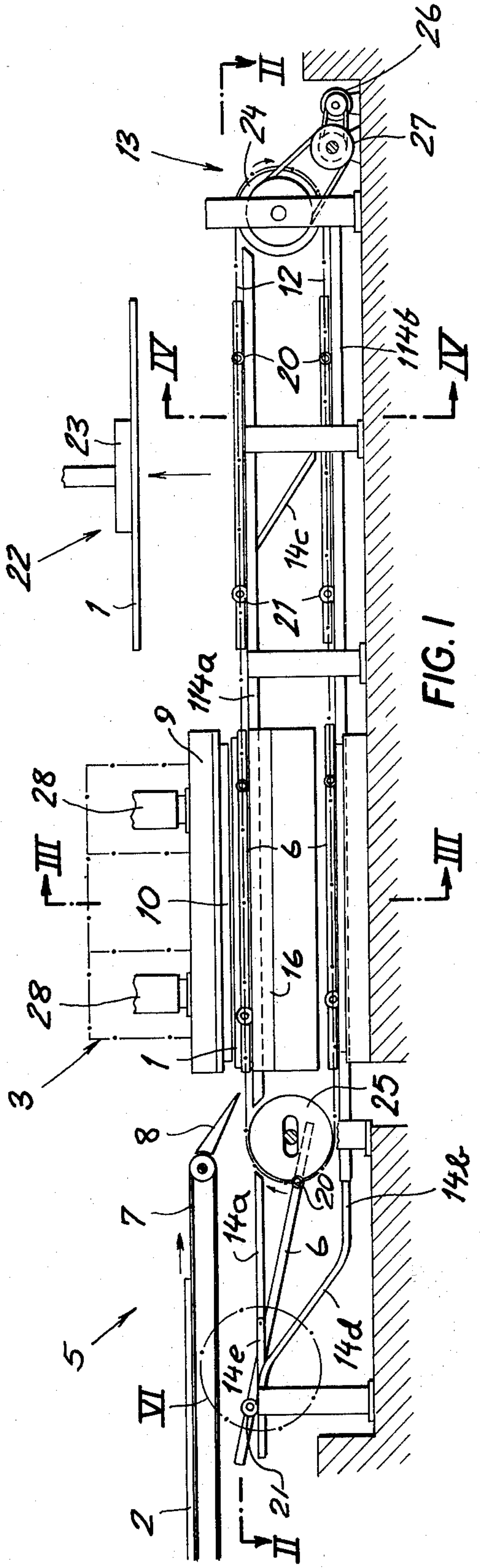
FIG. 1 is a somewhat diagrammatic side-elevational view of an apparatus embodying our invention.

The apparatus shown in the drawing comprises a loading station on which mats 2 of the aforedescribed type, e.g. comprising wet mixtures of asbestos fibers and cement, are delivered by a supply belt 7 and a chute 8 to an endless conveyor 13 passing through a single-stage press 3 (indicated only diagrammatically in FIGS. 1 and 2) and thence, as compacted boards 1, to an unloading stage 22. Conveyor 13 comprises two parallel endless chains 12 which pass around front and rear sprockets 24, 25, the front sprocket 24 being driven by a motor 26 via a transmission 27. A series of preferably metallic rectangular trays 6 with perforations 17 are linked near their front ends with the chains 12 via studs 11 which carry small rollers 20 riding on upper rails **114*a* on the way from loading station 5 to unloading station 22 and returning on lower rails 114*b* to the loading station, these front ends following the path of the chains around the sprockets 24 and 25. The trays 6 are further provided at their rear ends with rollers 21, axially separated by a distance less than that of the chains 12, which ride on tracks formed by horizontal rail portions 14*a* at the level of rails 114*a*, descending ramps 14*c* downstream of press 3, horizontal rail portions 14*b* at the level of rails 114*b*, and ascending ramps 14*d* upstream of press 3. A swingable tongue 14*e* allows the rollers 21** to pass upwardly on the return movement to the level of rails 14*a* preparatorily to the next forward travel through the press.

Figure 3:
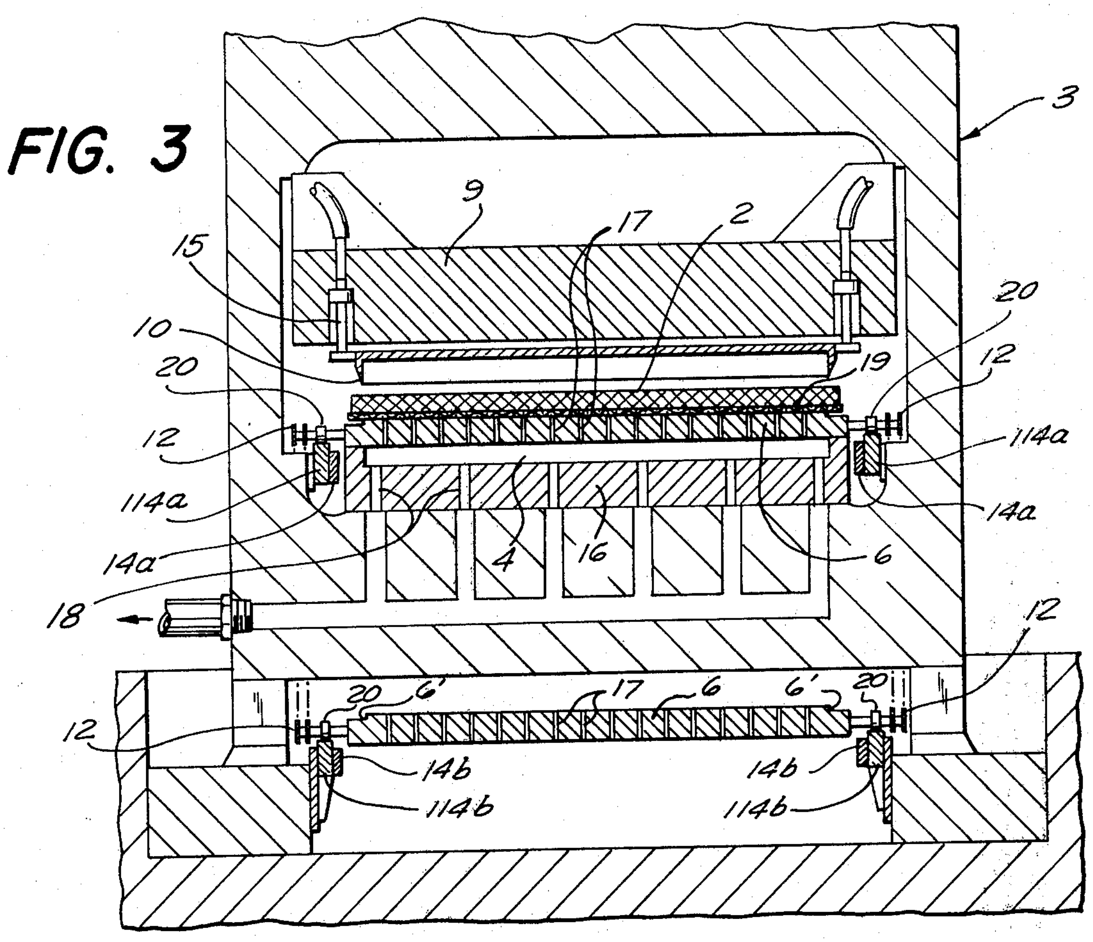
Figure 4:
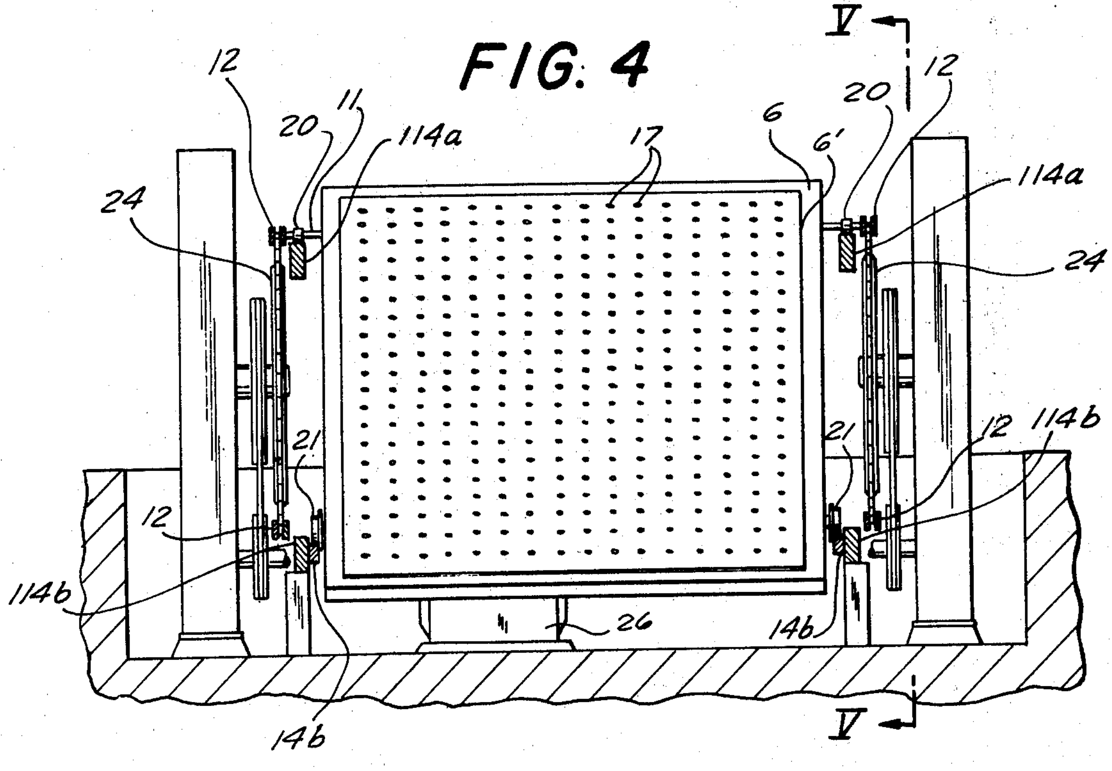

The tray positions of FIGS. 1, 3 and 4 occur at different stages of operation and illustrate the swing of the trays in the region of unloading station 22. The latter may comprise one or more suction cups 23 on vertically movable and outwardly swingable arms, designed to lift the compressed boards off the conveyor trays 6.

The conversion of the wet mats 2 into the boards 1 takes place between an upper press platen 9 and a lower press platen 16, the latter being shown provided with perforations 18 and transverse channels 4 through which excess water may be drained off by way of perforations 17 of trays 6. The upper platen 9, vertically reciprocable by pistons 28 diagrammatically illustrated in FIG. 1, carries a cutting die in the form of a sharp-edged rectangular frame 10 designed to trim the oversized mats 2 conveyed into the gap between the platens. In FIG. 3 the cutting frame 10 is shown mounted on the upper platen 9 with the aid of hydraulic jacks 15 actuated just after the downstroke of platen 9; in FIG. 7 these jacks have been replaced by spring-loaded bolts 115 (only one shown).

If desired, the excess water (or some of it) could also be exhausted through channels formed in the upper platen 9.

Figure 2:
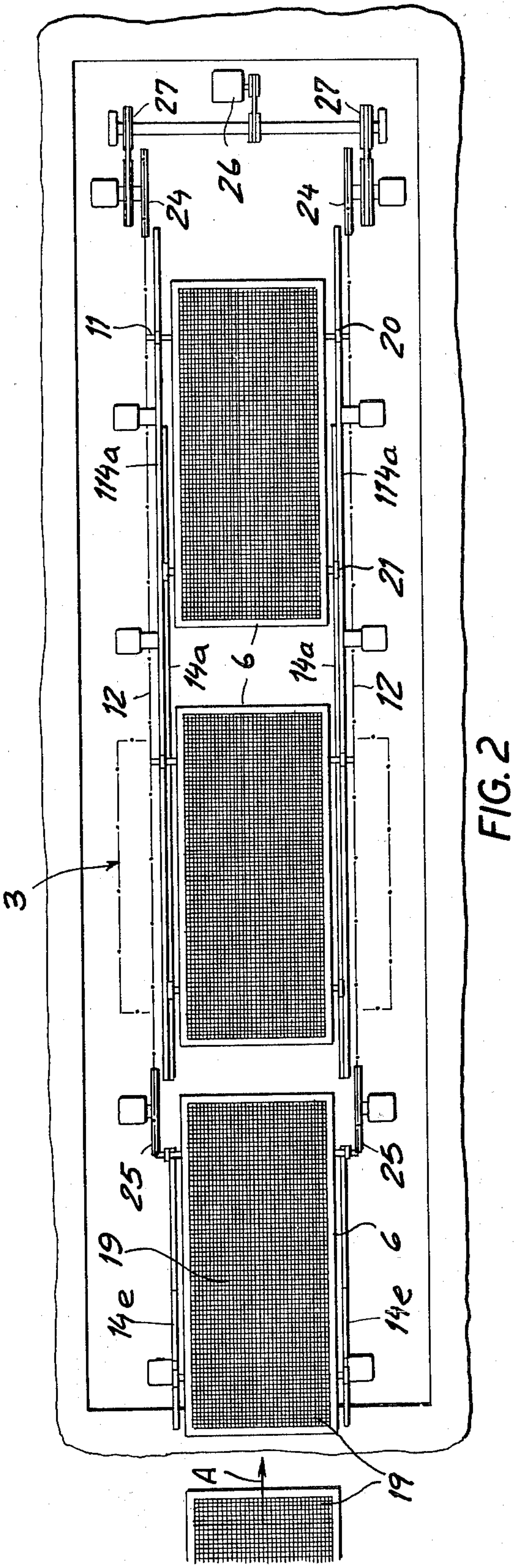
FIGS. 2, 3 and 4 are sectional views respectively taken on lines II — II, III — III and IV — IV of FIG. 1.

A series of fine-mesh screens 19 are deposited on the trays, as schematically indicated in FIG. 2 by an arrow A, by a supply mechanism which may be similar to the mechanism 7, 8 delivering the mats 2. The screens 19 are placed on the trays 6 as soon as they have resumed their horizontal position, just before the mats 2 are allowed to slide onto the forwardly moving trays.

As illustrated in FIGS. 3 and 4, the trays 6 may also be formed with a shallow marginal rabbet defining a shoulder 6' of rectangular configuration coacting with the edge of die frame 10 to insure a clean cut.

As will be apparent from FIG. 3, the screens 19 overhang the rabbeted trays 6 on entering the press so as to support the loosely coherent wet mats 2 beyond the shoulders 6' until they are trimmed by the descending frame 10 coming to rest on the underlying rabbet.

We claim:

1. An apparatus for producing boards of filamentary material, comprising:

a press including a stationary perforated lower platen and a vertically reciprocable upper platen spacedly overlying said lower platen;

conveyor means including a series of perforated trays passing through the gap between said platens;

loading means upstream of said press for depositing oversized mats of filamentary material, permeated by a wet hydraulic binder, on said trays for compaction between said platens;

die means on said upper platen forming a sharp-edged rectangular frame for trimming the edges of said oversized mats during compaction, said trays being provided with a rabbet forming a stop for said frame and defining a complementary anvil for said die means bounded by a rectangular shoulder conforming to said frame;

supply means upstream of said loading means for delivering to said trays a fine-mesh screen, overhanging said shoudler, for supporting the mats subsequently deposited on said trays whereby said mats and said screens are trimmed simultaneously upon said frame coming to rest on said rabbet; and unloading means downstream of said press for the removal of trimmed and compacted boards formed from said mats and screens.

2. An apparatus as defined in claim 1 wherein said conveyor means comprises a pair of parallel endless chains led in vertical loops with upper and lower runs, and rail means forming upper and lower tracks adjacent said upper and lower runs with ascending upstream ramps and descending downstream ramps between said tracks, each of said trays having a leading end articulated to said chains and a trailing end provided with rollers riding said tracks and ramps whereby the tray is maintained substantially horizontal on passing through said press along said upper runs and on returning to said loading means underneath said press along said lower runs.

3. An apparatus as defined in claim 1, further comprising yieldable mounting means for said die means on said upper platen.

4. An apparatus as defined in claim 3 wherein said mounting means includes a set of fluid-actuated jacks.

5. An apparatus as defined in claim 3 wherein said mounting means includes a set of spring-loaded pins.

* * * * *